United States Patent [19]

George

[11] Patent Number: 4,758,367
[45] Date of Patent: Jul. 19, 1988

[54] TRIETHYLENE GLYCOL-BASED HEAT TRANSFER FLUIDS

[75] Inventor: Kathleen F. George, Cross Lanes, W. Va.

[73] Assignee: Union Carbide Corporation, Danbury, Conn.

[21] Appl. No.: 865,669

[22] Filed: May 22, 1986

[51] Int. Cl.$^4$ ............................................... C09K 5/00
[52] U.S. Cl. ...................................... 252/75; 252/74; 252/77
[58] Field of Search .................................... 252/74, 75

[56] References Cited

U.S. PATENT DOCUMENTS

| | | | |
|---|---|---|---|
| 2,147,395 | 2/1939 | Bayes | 252/75 |
| 2,147,409 | 2/1939 | Lamprey | 252/75 |
| 2,384,553 | 9/1943 | Kiffer | 252/75 |
| 3,030,308 | 4/1962 | Agnew et al. | 252/74 |
| 4,241,014 | 12/1980 | Hirozawa et al. | 252/75 |
| 4,389,371 | 6/1983 | Wilson et al. | 252/76 |
| 4,452,715 | 6/1984 | Hirozawa | 252/75 |
| 4,452,758 | 6/1984 | Wilson et al. | 422/15 |
| 4,455,248 | 6/1984 | Wood | 252/75 |
| 4,545,925 | 10/1985 | Bosen et al. | 252/389 A |
| 4,548,787 | 10/1985 | Wilson et al. | 422/15 |

FOREIGN PATENT DOCUMENTS 7806485 4/1980 Brazil .

OTHER PUBLICATIONS

Herndon, L. R. and Reid, E. E., "The Decomposition of Organic Compounds at High Temperatures and Pressures", J. Am. Chem. Soc., vol. 50, 3066–3073 (1928).

Primary Examiner—Robert Wax
Attorney, Agent, or Firm—Norman L. Balmer

[57] ABSTRACT

Single-phase, thermally-stable, corrosion-inhibiting heat transfer fluids comprising triethylene glycol, a corrosion-inhibiting amount of a mixture of a soluble borate compound and a soluble Group VIa metal oxygenate compound selected from the group consisting of chromate, molybdate and tungstate compounds, and, optionally, water, a copper corrosion inhibitor and sodium nitrate.

21 Claims, No Drawings

TRIETHYLENE GLYCOL-BASED HEAT TRANSFER FLUIDS

FIELD OF THE INVENTION

This invention relates to single-phase triethylene glycol-based heat transfer fluids with excellent thermal stability and high corrosion inhibiting properties. These fluids are especially well-suited for use at high operating temperatures.

BACKGROUND OF THE INVENTION

Water is often used as a heat-transfer medium because it affords high rates of heat transfer at relatively small expense and it is thermally stable and non toxic. However, water has definite limitations to its use as a heat transfer fluid. Water is only useful over a limited temperature range and has a tendency to corrode metals that it comes in contact with.

Glycol based heat transfer fluids (with or without corrosion inhibitors) are often added to aqueous systems to broaden the operable temperature range. As a result of its low cost, ethylene glycol is the most commonly used head transfer fluid base. Due to its low boiling point, however, ethylene glycol is not practically useful for high temperature applications.

Aqueous glycol-based heat transfer fluids generally create problems with respect to metal corrosion. Anions such as bicarbonates, sulfates and chlorides, which have a corrosive effect on the metals they contact, may be present in the water medium. The glycol base itself when subjected to conditions of elevated temperatures and aeration often develops corrosive tendencies towards metals. To combat corrosion, heat transfer fluids typically contain corrosion inhibitor additives capable of buffering the solution to a pH between 7 and 11.

The prior art describes glycol-based heat transfer compositions. For example, U.S. Pat. No. 2,147,395 discloses liquid compositions with non-corrosive and anti-freeze properties comprising an alcohol, and a mixture of a soluble nitrate and a soluble salt of tungstic, selenic or molybdic acids. Examples of alcohols disclosed by this patent include the monohydroxy alcohols and polyhydroxy alcohols such as ethylene glycol, propylene glycol, diethylene glycol, mixtures of such glycols with glycerol. This patent further discloses that a soluble phosphate can optionally be added to the composition to further protect aluminum.

U.S. Pat. No. 2,147,409 discloses liquid compositions with non-corrosive and anti-freeze properties comprising an alcohol and a soluble salt of tungstic, selenic or molybdic acid. Ethylene glycol, propylene glycol, diethylene glycol and glycerol are listed as useful alcohols. This patent further discloses that 0.1% of a soluble phosphate can be added for further protection of aluminum if desirable.

U.S. Pat. No. 2,384,553 discloses an ethylene glycol-based antifreeze containing an inhibitor combination of a glycol soluble inorganic borate and phosphate salts.

U.S. Pat. No. 3,030,308 discloses single phase antifreeze compositions and aqueous solutions thereof comprising a water soluble liquid freezing point depressant, magnesium metaborate and an alkali metal molybdate. This patent discloses that the freezing point depressants comprise water miscible liquid alcohols such as monohydroxy lower alkyl alcohols and liquid polyhydroxy alcohols such as alkylene and dialkylene glycols. Specific alcohols disclosed by this patent are methanol, ethanol, propanol, isopropanol, butanol, ethylene glycol, diethylene glycol, propylene glycol, butylene glycol and mixtures thereof. This patent further discloses that the preferred glycol is ethylene glycol which can contain about 10% diethylene glycol.

U.S. Pat. No. 4,389,371 discloses an anti-freeze composition comprising (a) an alcohol selected from at least one of the group consisting of methanol, ethanol, propanol, ethylene glycol, diethylene glycol, triethylene glycol, propylene glycol and glycerol and (b) a corrosion inhibitor comprising an effective amount of a conventional corrosion inhibitor selected from the group consisting of an alkali metal carbonate, borax, an alkali metal dichromate, an alkali metal silicate, phosphorous acid, phosphoric acid, an alkali metal tungstate, benzotriazole, tolyltriazole, an alkali metal salt of benzoic or toluic acid, an alkali metal salt of a phenol, an alkanolamine and an organo-silicone compound in addition to an alkanolamine phosphate and a heterocyclic nitrogen-containing compound. This patent further discloses that ethylene glycol is the preferred alcohol.

U.S. Pat. No. 4,452,758 discloses an antifreeze concentrate composition comprising a water-soluble alcohol selected from the group consisting of methanol, ethanol, propanol, ethylene glycol, diethylene glycol, triethylene glycol, propylene glycol and glycerol, and alkanolamine, an alkali metal phosphate, an imidazoline and a conventional corrosion inhibitor.

U.S. Pat. No. 4,455,248 discloses a single phase glycol based antifreeze composition comprising one or more glycols selected from the group consisting of ethylene glycol, diethylene glycol, triethylene glycol, propylene glycol and glycerol and additionally comprising water, sodium metasilicate, phosphate of potassium, sodium metaborate or sodium tetraborate, sodium nitrate, a copper corrosion inhibitor and alkali. This patent further discloses that a phosphate of potassium is necessary for the purposes of the composition and that dipotassium phosphate ($K_2HPO_4$) is preferred.

U.S. Pat. No. 4,545,925 discloses a freeze protected, heat transfer fluid composition comprising at least about 0.25 weight percent phosphate as $PO_4$, greater than 0.025 weight percent nitrite as $NO_2$, and the balance a polyhydroxyalcohol such as propylene glycol, diethylene glycol and, preferably, ethylene glycol.

U.S. Pat. No. 4,548,787 discloses that water-soluble salts of an acid selected from the group consisting of molybdic, tungstic, and selenic acids in combination with a water-soluble phosphate provide a synergistic improvement in the retardation of corrosion of aluminum water pumps in contact with aqueous liquids such as aqueous antifreeze compositions containing a water soluble alcohol freezing point depressant.

Representative of some commercially available ethylene glycol based heat transfer fluids are Ambitrol CN ® and Dowtherm ® SR-1 available from Dow Chemical Company, JEFFCOOL ® E-100 available from Texaco, and UCARTHERY ® available from Union Carbide Corporation.

However, the known glycol based compositions frequently possess characteristics that render the compositions undesirable for use as higher temperature heat transfer fluids. For example, ethylene glycol and many corrosion inhibitors commonly used in antifreeze formulations, e.g. alkanolamines and some hetercyclic nitroqen compounds, can thermally degrade at high operating temperatures (see, e.g., Herndon, L. R. and Reid, E. E., Decomposition of Organic Compounds at High Operating Temperatures and Pressures, J.A.C.S(50), p. 3066-3073 (1928)). This degradation shortens the operating life of the fluid and requires replacement of the fluid. Frequent replacement of the fluid in industrial applications is costly and often involves time consuming system shutdowns.

Additionally, certain additives useful in the prior art glycol based compositions, such as phosphate-containing corrosion inhibitors, are not soluble in concentrated triethylene glycol solutions. Consequently, these additives can form undesirable precipitates in heat transfer fluid concentrates containing triethylene glycol.

Accordingly, it is the purpose of this invention to provide single phase triethylene glycol-based heat transfer fluid concentrates and aqueous compositions thereof which are useful over a broad range of temperatures; which are thermally stable over the operable temperature range, particularly at high temperatures; and which provide corrosion protection.

SUMMARY OF THE INVENTION

This invention relates to a single-phase thermally-stable corrosion-inhibiting heat transfer fluid concentrate composition comprising triethylene glycol and a corrosion-inhibiting amount of a mixture of a soluble borate compound and a soluble Group VIa metal oxygenate compound selected from the group consisting of chromate, molybdate and tungstate compounds.

This invention also relates to aqueous compositions prepared from the heat transfer fluid concentrate compositions.

This invention further relates to a process for supplying heat to liquids (such as, but not limited to, petroleum materials) which comprises:

(a) heating a heat transfer fluid composition comprising triethylene glycol, water and a corrosion inhibiting amount of a mixture of a soluble borate compound and a soluble Group VIa metal oxygenate compound selected from the group consisting of chromate, molybdate or tungstate compounds, to a temperature in the range of about 200° F. to about 400° F.; and (b) contacting the heat transfer fluid composition with a conduit or other receptacle containing the liquid. The compositions of this invention are particularly useful in supplying heat to petroleum materials drilled and transported in colder climates to improve the fluidity and reduce the viscosity of the petroleum materials.

DESCRIPTION OF THE INVENTION

This invention relates to single-phase, thermally-stable, corrosion inhibiting heat transfer fluid concentrate compositions comprising triethylene glycol and a corrosion inhibiting amount of a mixture of a soluble borate compound and a soluble Group VIa metal oxygenate compound selected from the group consisting of chromate, molybdate and tungstate compounds. The preferred soluble Group VIa metal oxygenate compound is a soluble molybdate compound.

For the purposes of this invention, "thermally-stable" means that (1) the pH of the composition decreases less than about 1 unit, preferably less than about ½ unit and most preferably less than about ¼ unit, when heated at 350° F. for 7 days; and (2) a 1 gram sample of the composition forms less than 0.01 grams, preferably less than 0.001 grams and most preferably less than 0.0005 grams, of precipitate when heated at 350° F. for 7 days.

For the purposes of this invention, "corrosion-inhibiting" means that metals immersed in the composition for 7 days at 350° F. suffer a corrosion rate of less than 10 mil per year, preferably less than 2 mil per year, and most preferably, less than 1 mil per year. The corrosion rate is determined by weighing a metal specimen and then immersing the specimen in a vessel containing a solution containing 160 ml of heat transfer fluid concentrate composition and 140 ml of corrosive water which contains 100 parts per million each of chloride, sulfate and bicarbonate ions derived from the respective sodium salts. The vessel is pressurized to 150 psig with nitrogen and heated to a solution temperature of 350° F. for 7 days (168 hours). At the end of 168 hours, the metal specimen is removed, cleaned, dried and re-weighed. The weight loss of the specimen is determined and the corrosion rate in mils per year is calculated according to the following equation:

Corrosion Rate (mils per year) = weight loss (grams) $\times 3.46 \times 10^6 \div$ [specimen surface area (cm$^2$) $\times$ duration of test (hours) $\times$ specimen density (g/cm$^2$)].

The borate and Group VIa metal oxygenate useful in the composition of this invention are substantially completely dissolved in the concentrate composition and are in amounts such that the compounds are substantially completely dissolved at a temperature of about 15° C.

The borate and Group VIa metal oxygenate compounds may be added to the concentrate composition as triethylene glycol soluble salts or the salts may be formed in situ by the addition of boric acid or chromic, molybdic or tungstic acid to the triethylene glycol base. When formed in situ, the acids are dissolved in the triethylene glycol base and sufficient alkali metal base, e.g. sodium or potassium hydroxide, is added to adjust the pH to about 8.0 to 8.5.

The soluble molybdate compound useful in the compositions of the present invention can be any salt of molybdic acid which is soluble in the composition including alkali metal and ammonium molybdates. Useful molybdates include potassium molybdate, lithium molybdate, ammonium molybdate and, preferably, sodium molybdate. The soluble molybdate compound is employed in amounts to provide at least about 0.05 parts molybdate ion per 100 parts of triethylene glycol. Preferably about 0.2 parts to about 0.7 parts of the molybdate ion per 100 parts of triethylene glycol are employed.

The soluble chromate compound useful in the compositions of the present invention can be any salt of chromic acid which is soluble in the composition, such as sodium chromate, cesium chromate, ammonium chromate, potassium chromate, and the like. The soluble chromate compound is employed in amounts to provide at least about 0.05 parts chromate ion, preferably about 0.2 parts to about 0.7 parts chromate ion, per 100 parts of the triethylene glycol.

The soluble tungstate compound useful in the compositions of the present invention can be any salt of tungstic acid which is soluble in the composition, such as potassium tungstate, lithium tungstate, cesium tungstate, sodium tungstate and the like. The soluble tungstate compound is employed in amounts to provide at least about 0.05 parts tungstate ion, preferably about 0.2 parts to 0.7 parts tungstate ion, per 100 parts of the triethylene glycol.

The soluble borate compound useful in the compositions of the present invention can be any salt of boric acid which is soluble in the composition including alkali metal metaborates and tetraborates. Useful borates include sodium metaborate, sodium tetraborate and potassium tetraborate. The soluble borate compound is employed in amounts to provide at least about 0.1 parts borate ion per 100 parts of triethylene glycol. Preferably, about 0.4 parts to about 1.6 parts of the borate compound per 100 parts of triethylene glycol are employed.

If desired, the compositions of this invention can contain a corrosion inhibiting amount of a soluble copper corrosion inhibitor provided that the copper corrosion inhibitor is thermally stable at high temperatures. Preferred copper corrosion inhibitors include tolyltriazole, benzotriazole and other triazole derivatives such as Reomet 42 available from Ciba Geigy. Sodium mercaptobenzothiazole, for example, is not useful because it degrades at high temperatures. The copper corrosion inhibitor is employed in amounts to provide at least about 0.05 parts, preferably between 0.1 to 1.0 parts, of copper corrosion inhibitor per 100 parts of the triethylene glycol.

The compositions of this invention can optionally contain a soluble nitrate compound, such as alkali metal nitrates, preferably sodium nitrate, as a corrosion inhibitor, provided that the soluble nitrate compound is thermally stable. The soluble nitrate compound is employed in amounts to provide 0.1 parts to about 0.4 parts, preferably about 0.2 parts to about 0.25 parts, per 100 parts of the triethylene glycol.

The heat transfer fluid concentrate compositions of this invention can optionally contain a minor amount of water to help solubilize the inhibitor additives, usually less than 8 percent, preferably between 5-7%, by volume, based on the total volume of the concentrate composition. The concentrate compositions of this invention are typically diluted with water to a desired aqueous concentration to produce the heat transfer fluid. Typically, the concentrate compositions are diluted with water to provide a water content of about 20% to 80% by volume and preferably about 25% to 50% by volume, based on the total volume of the concentrate composition. The specific dilution will depend on the desired use and the desired operative temperature range. Preferably the operative temperature range of the heat transfer fluid is between about −60° F. to about 400° F.

The pH of the compositions of this invention, whether the concentrate or diluted fluid, must be controlled for purposes of corrosion protection. The compositions should have a pH of 8 to 11. Control of the pH is provided by appropriate adjustment of the borate compound within the ranges specified herein, the borate acting as a buffer to maintain the pH within the desired range. Where the borate component is not prepared in situ from boric acid and caustic, in some cases it may be desirable to add caustic to the heat transfer fluid concentrate composition prior to use to adjust the pH to the aforementioned range.

The composition of this invention can contain a minor amount of glycols other than triethylene glycol provided that the presence of the other glycols does not adversely affect the useful temperature range or thermal stability of the heat transfer fluid. Preferably, glycols other than triethylene glycol should be present in amounts of less than 10 parts per 100 parts of triethylene glycol.

In addition to the ingredients described above, the heat transfer fluid concentrate compositions of this invention can contain other additives such as antifoam agents, acid-base indicators, dyes and the like provided that the additives are soluble in the compositions and are thermally stable at high temperatures. For example, because of the poor solubility of phosphate-containing additives, such as potassium or sodium phosphate, in triethylene glycol, the use of these phosphate-containing additives is undesirable in the compositions of this invention except, possibly, in very small amounts. The concentrate compositions can contain from about 0.05 to about 0.1 percent by weight, based on the weight of the glycol base, of an antifoam agent such as a polyalkylene oxide having a molecular weight of from about 1,000 to about 4,000, most preferably from about 2,200 to about 2,600. Suitable polyalkylene oxides include polyethylene oxide, polypropylene oxide or mixtures thereof. UCON ® LB 1145, available from Union Carbide Corporation, is particularly well suited for use as an antifoam agent herein. From about 0.001 to about 0.003 percent by weight based on the weight of the glycol base, of a dye such as Uranine, Orasol Red G, Alzarine Astrol Blue, etc. may also be present.

The heat transfer fluids produced from the compositions of this invention are especially useful in applications in which heat is to be supplied to petroleum materials drilled or transported in cold climates to improve the fluidity and decrease the viscosity of the petroleum materials. The heat transfer fluids produced from the compositions of this invention are also useful in conventional applications for heat transfer fluids, such as coolants in industrial engines. Due to the thermal stability of the fluids, the excellent protection provided by the corrosion inhibitors and the buffering capability of the fluid to maintain the desired pH, the heat transfer fluids produced from the compositions of this invention are especially useful in applications where it is desirable to provide long service life without fluid change-outs or fluid modifications once in service. The heat transfer fluids produced from the compositions of this invention are also useful in applications where there is no mechanical circulation of the heat transfer fluid. Among the metals to be protected by the heat transfer fluids produced from the compositions of this invention are brass, copper, solder, steel, iron and aluminum.

The following examples are presented to illustrate the present invention, but are not intended to limit its scope.

EXAMPLE 1

The following formulations were prepared:

| FORMULATION | Composition A | B |
|---|---|---|
| Triethylene glycol | 58% | 63% |
| Water | 40% | 36% |
| Inhibitors | 1% $Na_2MoO_4.2H_2O$ | 0.256% $PO_4$ |
|  | 1% $BO_3$ | 0.265% $BO_3$ |
|  |  | 0.02% Tolyltriazole |

Composition A is a diluted heat transfer fluid composition in accordance with the present invention. Composition B is a comparative heat transfer fluid composition containing phosphate.

The stability of the components of each composition was tested as follows: 300 ml each of Composition A and comparative Composition B were charged to open vessels and heated at 125° C. for 5 hours at atmospheric pressure such that 140 ml of the water in solution was boiled off. Each sample was then analyzed to determine the amount, if any, of precipitate formed and appearance changes indicative of stability problems. The results of this test are provided in Table 1 below.

TABLE 1

|  | Composition | |
| --- | --- | --- |
|  | A | B |
| Volume before test, ml | 300 | 300 |
| Appearance before test | Clear fluid | Clear fluid |
| Appearance after heating to 125° C. | Clear gold fluid | Hazy fluid with white precipitate |
| Volume of fluid after test | 160 ml | 160 ml |
| Precipitate | none | 1.3 g |

As water boiled out of solution, no precipitate was formed in Composition A. In contrast, as the water boiled out of comparative Composition B which contains the phosphate, a significant amount of precipitate formed.

EXAMPLE 2

This example demonstrates the excellent corrosion protection provided by the heat transfer fluid compositions of this invention.

A. Heat transfer fluid composition formulations were prepared from commercially available triethylene glycol, crystalline sodium molybdate, boric acid, a sufficient amount of potassium hydroxide to obtain the desired pH, a copper corrosion inhibitor if specified, and distilled water. The compositions were prepared by heating the triethylene glycol to 40°-50° C., then adding the other components in a stepwise fashion, then adjusting the pH. The formulations are given in Table 2.

TABLE 2

| FORMULATION | A | B | C | D | E |
| --- | --- | --- | --- | --- | --- |
| TEG % | 92.68 | 97.66 | 97.462 | 92.974 | 94.5 |
| Boric Acid, % | 1.03 | 1.017 | 1.015 | 1.6 | 0.2 |
| Sodium molybdate dihydrate | 1.03 | 0.407 | 1.015 | 1 | 0.2 |
| Copper corrosion inhibitor | none | Reomet 42* | Reomet 42* | Benzo-triazole | none |
| Copper inhibitor conc., % | — | 0.407 | 0.406 | 0.4 | — |
| Sodium nitrate, % | none | 0.2 | none | none | none |
| Potassium hydroxide | 0.03 | 0.076 | 0.025 | 0.257 | 0.025 |
| Water | 5.23 | 0.233 | 0.077 | 3.769 | 5.08 |

*note: Reomet 42 is a triazole derivative available from Ciba Geigy, Ardsley, NY B. To test the corrosion inhibition protection of the compositions prepared in part A, six metal specimens were used for each composition. Steel, copper, brass and solder specimens were 2 in.×1 in.×1/16 in. Aluminum and iron specimens were 2 in.×1 in.×⅛ in. The specimens were drilled through the center with a 17/64 in. drill, polished, cleaned with a bristle brush and pumice powder, dried and weighed. The specimens were assembled into a specimen bundle by placing one specimen of each metal on an insulated screw and placing insulating spacers (made of tetrafluoroethylene polymer) between the specimens. Support legs made of tetrafluoroethylene polymer were placed at each end of each of the specimen bundles.

Each specimen bundle was then placed in a 500 ml stainless steel pressure vessel along with 300 ml of test solution. The test solution consists of 160 ml of heat transfer fluid composition and 140 ml of corrosive water which contained 100 parts per million each of chloride, sulfate and bicarbonate ions derived from the respective sodium salts. The specimen bundle was totally immersed in fluid. The vessel was pressurized to 150 psig with nitrogen then heated to a fluid temperature of 350° F. as measured by a thermocouple. The temperature was maintained at 350° F. by means of a cylindrical electrical heater that enclosed the vessel for the period of 168 hours.

At the end of the test period, the specimens were removed, cleaned of corrosion products, dried and reweighed. The weight loss of each specimen was determined, then the corrosion rate in mils per year was calculated by the following equation:

Corrosion rate (mils per year = weight loss (grams) $\times$ 3.46 $\times$ 10$^6$ ÷ [specimen surface area (cm$^2$) $\times$ duration of test (hr) $\times$ specimen density (g/cm$^3$)]

The results of each test are listed in Table 3 below.

TABLE 3

| COMPOSITION | A | B | C | D | E |
| --- | --- | --- | --- | --- | --- |
| PH, Before | 8.25 | 8.55 | 8.57 | 8.3 | 8.26 |
| PH, After | 8.38 | 8.43 | 8.24 | 8.2 | 8.86 |
| CORROSION RATES in mils per year | | | | | |
| Copper | 0.55 | 0.69 | 0.49 | 0.6 | 0.45 |
| Solder | 4.89 gain | 6.48 gain | 6.48 gain | no data | 1.89 |
| Brass | 0.89 | 0.55 | 0.64 | 0.46 | 0.52 |
| Steel | 0.18 | 0.35 | 0.22 | 0.25 | 0.26 |
| Iron | 0.08 | 0.05 | 0.25 | 3.93 gain | 1.5 gain |
| Aluminum | 2.3 gain | 0.47 gain | 2.85 gain | 0.87 | 0.74 |

The compositions provided excellent corrosion protection, demonstrating less than one mil per year corrosion rate for most of the metals tested.

Additionally, the compositions exhibited excellent thermal stability, demonstrated by the low corrosion rate and the pH stability of the compositions.

While this invention has been described with reference to certain specific embodiments, it will be recognized by those skilled in the art that many variations are possible without departing from the scope and spirit of the invention and it will be understood that it is intended to cover all changes and modifications to the invention disclosed herein for the purpose of illustration which do not constitute departures from the spirit and scope of the invention.

What is claimed is:

1. A single-phase, thermally-stable, corrosion inhibiting heat transfer fluid concentrate composition comprising a glycol component which comprises at least 90% by volume triethylene glycol and a mixture of a soluble borate compound and a soluble Group VIa metal oxygenate compound selected from the group consisting of chromate, molybdate and tungstate compounds in an amount sufficient to provide:
    (a) a thermal stability such that the pH of the composition decreases less than 1 unit and a 1 gram sample of the composition forms less than 0.01 grams of precipitate, when heated at 350° F. for 7 days; and
    (b) a corrosion protection such that metals immersed in the composition for 7 days at 350° F. suffer a corrosion rate of less than about 10 mil. per year.

2. A concentrate composition as recited in claim 1 wherein the soluble Group VIa metal oxygenate compound is a soluble molybdate compound.

3. A concentrate composition as recited in claim 2 wherein the concentrate composition comprises at least 0.05 parts of the soluble molybdate compound per 100 parts of the triethylene glycol and at least 0.1 parts of the soluble borate compound per 100 parts of triethylene glycol.

4. A concentrate composition as recited in claim 3 wherein the concentrate composition comprises about 0.2 parts to about 0.7 parts of the soluble molybdate compound per 100 parts of the triethylene glycol and about 0.4 parts to about 1.6 parts of the soluble borate compound per 100 parts of the triethylene glycol.

5. A concentrate composition as recited in claim 4 wherein the soluble molybdate compound is sodium molybdate.

6. A concentrate composition as recited in claim 5 wherein the soluble borate compound is boric acid or sodium tetraborate.

7. A concentrate composition as recited in claim 1 wherein the concentrate composition comprises a corrosion inhibiting amount of soluble copper corrosion inhibitor.

8. A concentrate composition as recited in claim 7 wherein the concentrate composition comprises about 0.1 parts to about 1.0 parts of the soluble copper corrosion inhibitor per 100 parts of the triethylene glycol.

9. A concentrate composition as recited in claim 8 wherein the copper corrosion inhibitor is benzotriazole or tolyltriazole.

10. A concentrate composition as recited in claim 1 wherein the concentrate composition comprises 0.1 parts to 0.4 parts of a soluble nitrate compound per 100 parts of the triethylene glycol.

11. A concentrate composition as recited in claim 10 wherein the concentrate composition comprises 0.2 parts to 0.25 parts of a soluble nitrate compound per 100 parts of the triethylene glycol.

12. A concentrate composition as recited in claim 11 wherein the soluble nitrate compound is sodium nitrate.

13. A single-phase, thermally-stable, corrosion-inhibiting heat transfer fluid composition comprising from about 20% to about 80% by volume of the concentrate composition of claim 1 with the balance being water.

14. A composition as recited in claim 1 wherein the composition comprises:
    (a) about 25% to 50% by volume water;
    (b) about 50% to about 75% by volume triethylene glycol;
    (c) about 0.2 parts to about 0.7 parts of sodium molybdate per 100 parts of the triethylene glycol;
    (d) about 0.4 parts to about 1.6 parts of boric acid per 100 parts of the triethylene glycol; and
    (e) about 0.1 parts to about 1.0 parts of a soluble copper corrosion inhibitor per 100 parts of the triethylene glycol.

15. A composition as recited in claim 14 wherein the copper corrosion inhibitor is benzotriazole or tolyltriazole.

16. A composition as recited in claim 14 wherein the composition comprises about 0.2 parts to about 0.25 parts of sodium nitrate per 100 parts of the triethylene glycol.

17. A process for supplying heat to a liquid in a conduit which comprises:
    (a) heating a heat transfer fluid composition as recited in claim 1 to a temperature in the range of about 200° F. to about 400° F.; and
    (b) contacting the heat transfer fluid composition with the conduit.

18. A process as recited in claim 17 wherein the heat transfer fluid composition is as recited in claim 2.

19. A process as recited in claim 17 wherein the heat transfer fluid composition is as recited in claim 3.

20. A process as recited in claim 17 wherein the heat transfer fluid is as recited in claim 4.

21. A process as recited in claim 17 wherein the liquid is a petroleum material.

* * * * *